United States Patent
Locke

(10) Patent No.: US 10,291,785 B2
(45) Date of Patent: May 14, 2019

(54) DATA UNIT RETRANSMISSION

(71) Applicant: Broadcom Corporation, Irvine, CA (US)

(72) Inventor: Michael Eugene Locke, Santa Clara, CA (US)

(73) Assignee: AVAGO TECHNOLOGIES INTERNATIONAL SALES PTE. LIMTIED, Singapore (SG)

( * ) Notice: Subject to any disclaimer, the term of this patent is extended or adjusted under 35 U.S.C. 154(b) by 245 days.

(21) Appl. No.: 15/285,028

(22) Filed: Oct. 4, 2016

(65) Prior Publication Data

US 2017/0104556 A1 Apr. 13, 2017

Related U.S. Application Data

(60) Provisional application No. 62/239,237, filed on Oct. 8, 2015, provisional application No. 62/385,934, filed on Sep. 9, 2016.

(51) Int. Cl.
*G06F 11/00* (2006.01)
*H04M 11/06* (2006.01)
(Continued)

(52) U.S. Cl.
CPC ......... *H04M 11/062* (2013.01); *H03M 13/43* (2013.01); *H03M 13/611* (2013.01); *H04L 1/1893* (2013.01)

(58) Field of Classification Search
CPC .. H04M 11/062; H03M 13/43; H03M 13/611; H04L 1/1893
See application file for complete search history.

(56) References Cited

U.S. PATENT DOCUMENTS

| 5,210,751 A | * | 5/1993 | Onoe | H04L 1/1809 |
| | | | | 370/349 |
| 5,400,322 A | * | 3/1995 | Hunt | H04L 1/206 |
| | | | | 370/468 |

(Continued)

OTHER PUBLICATIONS

Recommendation ITU-T, G.9701, Telecommunication Standardization Sector of ITU, Series G: Transmission Systems and Media, Digital Systems and Networks, Access networks—Metallic access networks; Fast access to subscriber terminals (G.fast)—Physical layer specification, Dec. 2014, pp. 1-324, Geneva, Switzerland.

(Continued)

*Primary Examiner* — Marc Duncan
*Assistant Examiner* — Jonathan D Gibson
(74) *Attorney, Agent, or Firm* — Morgan, Lewis & Bockius LLP

(57) ABSTRACT

A source node may send a first data unit to a destination node. To send the first data unit, the source node may transmit a modulation pattern over a transmission medium. In some cases, particular data units may correspond to modulation patterns with features that cause errors in transmission. The source node may receive an indication of an error from the destination node. To avoid repeated errors the retransmission, coding circuitry at the source node may alter data within the first data unit to generate a retransmission data unit. The alteration may result in the retransmission data unit corresponding to a modulation pattern different from that of the first data unit. The new modulation pattern may lack the error causing features and reduce the chance of repeated errors.

20 Claims, 6 Drawing Sheets

(51) Int. Cl.
*H03M 13/43* (2006.01)
*H03M 13/00* (2006.01)
*H04L 1/18* (2006.01)

(56) References Cited

U.S. PATENT DOCUMENTS

| | | | | | |
|---|---|---|---|---|---|
| 5,479,447 | A | * | 12/1995 | Chow | H04L 5/0042 370/468 |
| 5,533,034 | A | * | 7/1996 | Kuwata | H04L 1/1692 714/747 |
| 5,629,948 | A | * | 5/1997 | Hagiwara | H04L 1/1812 714/748 |
| 6,021,516 | A | * | 2/2000 | Okajima | H04L 1/0007 714/748 |
| 6,208,663 | B1 | * | 3/2001 | Schramm | H04L 1/0006 370/465 |
| 7,813,418 | B2 | * | 10/2010 | Tzannes | H04L 1/0025 375/222 |
| 8,091,004 | B2 | * | 1/2012 | Chernyshev | H04L 1/1893 714/748 |
| 8,335,267 | B2 | * | 12/2012 | Atarashi | H04L 1/0003 370/204 |
| 9,288,152 | B2 | * | 3/2016 | Wang | H04L 1/1874 |
| 2003/0072292 | A1 | * | 4/2003 | Yoon | H04B 7/264 370/342 |
| 2003/0081576 | A1 | * | 5/2003 | Kim | H04L 1/0003 370/335 |
| 2003/0097629 | A1 | * | 5/2003 | Moon | H04L 1/0003 714/751 |
| 2003/0153276 | A1 | * | 8/2003 | Terry | H04L 1/0003 455/69 |
| 2005/0097424 | A1 | * | 5/2005 | Golitschek | H04L 1/0003 714/749 |
| 2007/0060167 | A1 | * | 3/2007 | Damnjanovic | H04W 52/24 455/450 |
| 2008/0063007 | A1 | * | 3/2008 | Christiaens | H04L 1/0041 370/458 |
| 2008/0248758 | A1 | * | 10/2008 | Schedelbeck | H04L 1/1874 455/69 |
| 2009/0089638 | A1 | * | 4/2009 | Heise | H04L 1/0085 714/748 |
| 2010/0177701 | A1 | * | 7/2010 | Maheshwari | H04L 1/1685 370/328 |
| 2010/0185791 | A1 | * | 7/2010 | Pons | H04M 11/062 710/30 |
| 2011/0154147 | A1 | * | 6/2011 | Wu | H04L 1/1874 714/749 |
| 2011/0274147 | A1 | * | 11/2011 | Schelstraete | H04L 1/1887 375/220 |
| 2011/0276826 | A1 | * | 11/2011 | Schoppmeier | H04L 1/1896 714/16 |
| 2016/0329930 | A1 | * | 11/2016 | Wang | H04B 10/25 |

OTHER PUBLICATIONS

Recommendation ITU-T, G.998.4, Telecommunication Standardization Sector of ITU, Series G: Transmission Systems and Media, Digital Systems and Networks, Digital sections and digital line system—Metallic access networks, Improved impulse noise protection for digital subscriber line (DSL) transceivers, Jan. 2015, pp. 1-122, Geneva, Switzerland.

* cited by examiner

DATA UNIT RETRANSMISSION

PRIORITY CLAIM

This application claims priority to provisional application Ser. No. 62/239,237, filed Oct. 8, 2015, and entitled "Gfast Retransmission Improvement"; and provisional application Ser. No. 62/385,934, filed Sep. 9, 2016, and entitled "Data Unit Retransmission"; each of the foregoing being incorporated by reference in its entirety.

TECHNICAL FIELD

This disclosure relates to retransmission of data signals.

BACKGROUND

High-speed data paths are a crucial part of what is now indispensable worldwide data connectivity. The data paths are driven by many different types of communication devices, such as switches and routers that direct data packets from source ports to destination ports, helping to eventually guide the data packets from a source to a destination. Digital subscriber line (DSL) modems form an important part of the data connectivity ecosystem. Improvements in DSL modems will help enhance the communication capabilities of high-speed communication devices.

DETAILED DESCRIPTION

In various implementations, the techniques and architectures described below may be implemented in a system compliant with International Telecommunication Union (ITU) recommendation G.9701 (also known as Gfast). In this example implementation scenario, end operators may be connected by digital subscriber line (DSL) communication links to nearby high speed fiber optic communication links at up to 1 Gbps. Gfast compliant modems may convert data bits into constellations and modulates the constellations using an inverse discrete Fourier transform (iDFT).

Gfast compliant systems may retransmit Data Transmission Units (DTUs) using a technique that is similar to Ginp (ITU recommendation G.998.4). Gfast compliant systems may encapsulate data into DTUs.

Figure 1:
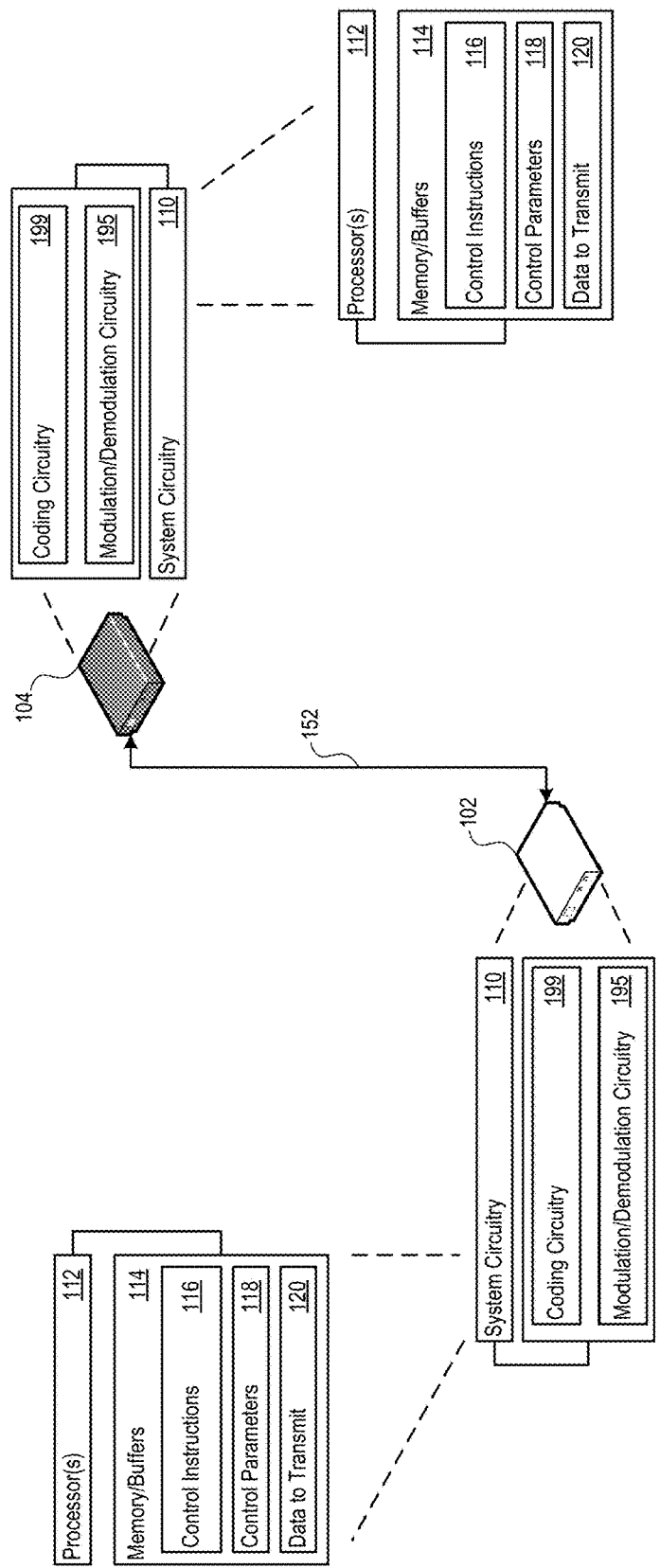
FIG. 1 shows example digital subscriber line (DSL) modems communicating over a wireline connection.

FIG. 1 shows example DSL modems communicating over a wireline connection 152. The modems 102 and 104 may implement (e.g., using coding 199 and modulation/demodulation 195 circuitry) DTU alteration on retransmission using any technique or combination of techniques noted below. Each system may include system circuitry 110. The DSL modems may be Gfast compliant, Ginp compliant, legacy DSL standards compliant or a combination thereof (e.g., via backwards compatibility).

The system circuitry 110 may include any combination of hardware, software, firmware, or other logic. The system circuitry 110 may be implemented, for example, with one or more systems on a chip (SoC), application specific integrated circuits (ASIC), discrete analog and digital circuits, and other circuitry. The system circuitry 110 is part of the implementation of any desired communication functionality in the modems 102, 104. The system circuitry 110 may include one or more processors 112 and memories/buffers 114. The memory/buffer 114 stores, for example, control instructions 116 that the processor 112 executes to carry out the communication functionality for the modems 102, 104. For example, the control instructions may include Gfast and/or Ginp compliant firmware. The control parameters 118 provide and specify configuration and operating options for the control instructions 116. The memory/buffer 114 may also store data 120 for transmission over the communication interfaces 108. In various implementations, the modems 102, 104 may include the same or similar hardware. However, in other implementations, the modems 102, 104 may differ (in some cases substantially) in their hardware layout.

Figure 2:
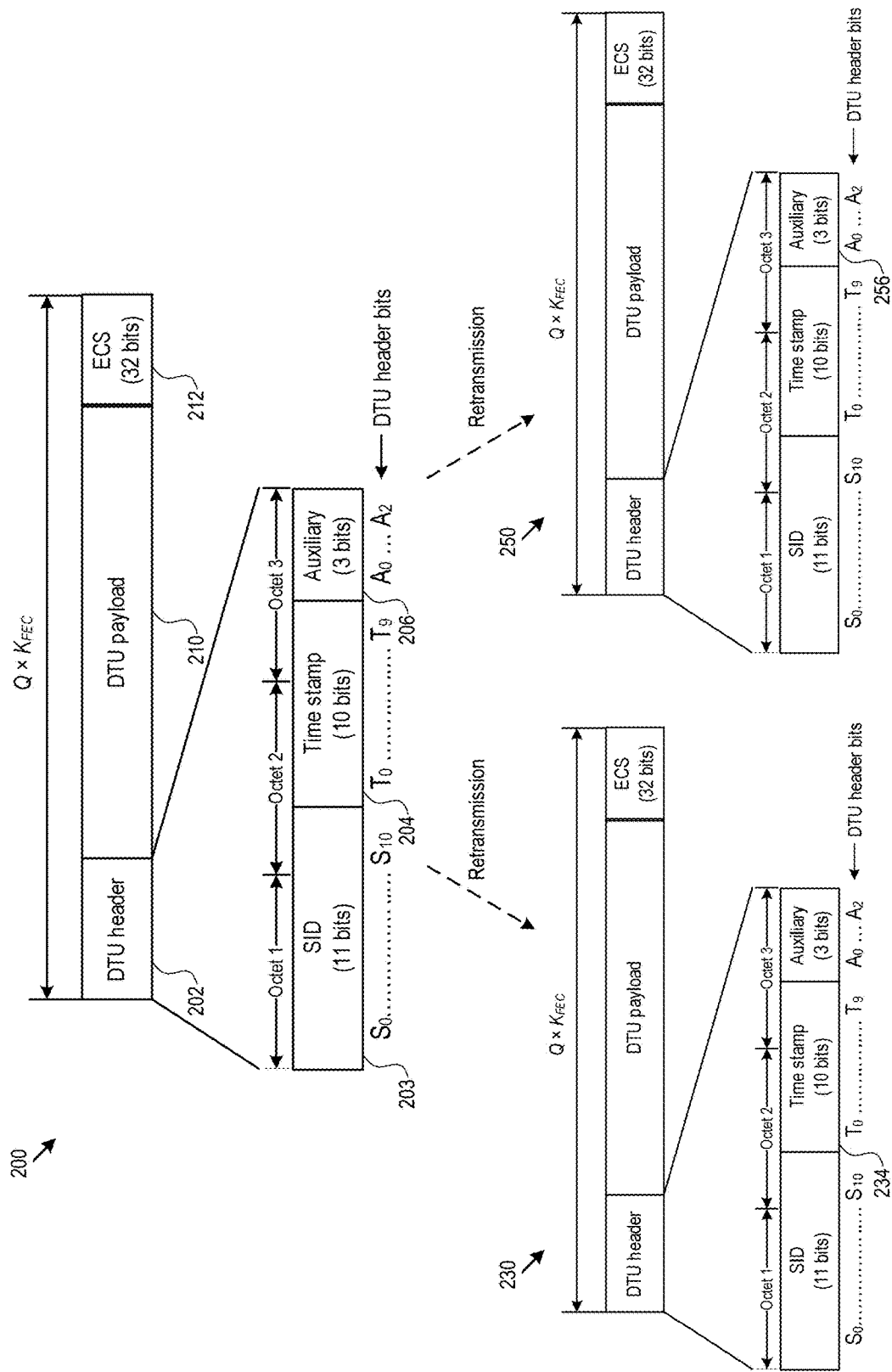
FIG. 2 shows an example data transmission unit (DTU) and example retransmissions.

FIG. 2 shows an example DTU 200 and example retransmissions 230, 250. In the example DTU 200, the DTU header 202 includes a sequence identifier (SID) field 203, a timestamp field 204, and reserved auxiliary bit field 206. The DTU 200 also includes a DTU payload 210 and an error correction field 212.

In the example retransmission 230, the timestamp field 234 has been altered with respect to the example DTU 200.

In the example retransmission 250, the reserved auxiliary bit field 256 has been altered with respect to the example DTU 200.

Figure 3:
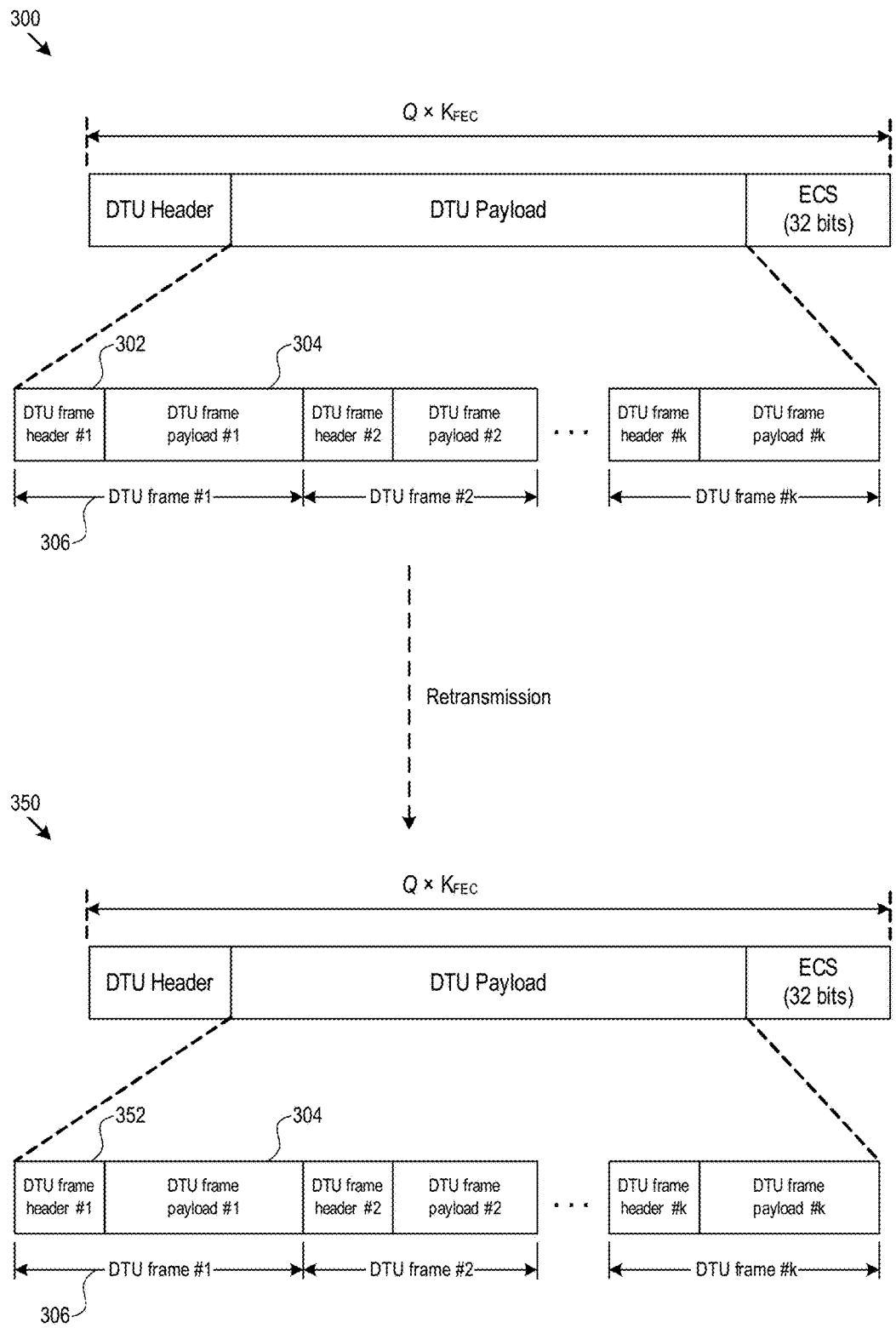
FIG. 3 shows an example DTU and an example retransmission.

FIG. 3 shows an example DTU 300 and an example retransmission 350. The example DTU 300 may include frame headers 302 and payloads 304 arranged in DTU frames 306.

In the example retransmission 350, a payload frame header 352 has been altered with respect to the example DTU 300.

A receiver may request retransmission of data units. The receiver may request retransmission of DTUs in which a data errors was detected. For example, a system may detect errors with a data unit through error coding, parity coding, detector saturation, a cyclic redundancy check (CRC) error, or other out-of-tolerance detection. In the example Gfast implementation, a DTU may include a 3 byte header, 'X' bytes of payload, 'R' * 'Q' bytes of Reed-Solomon redundancy, and 4 bytes of CRC. 'X' can be between 1 and 4039. 'R' can be between 2 and 16, and 'Q' can be between 1 and 16.

Gfast also uses a Gfast specific packet encapsulation technique for the DTU payload that results in more efficient packing of information than in previous XDSL standards. Each fragment or packet is preceded by a 1 or 2 byte header that indicates how many bytes are present and if the information is the start, middle, or end of a complete packet. If there are no packets to transmit the header is 0. Typically the remainder of the DTU will be filled with 0 after a 0 value header is encountered, although any value may be asserted.

In some cases, a data may be scrambled, e.g., by the coding circuitry 199, prior to encoding using a transform. In the Gfast example, DTUs may be scrambled by the system. However, in some systems, the scrambler may be reset to a standardized value each time a DTU is transmitted. This may result in the bits being transmitted for a particular DTU being the same for retransmissions of the DTU.

In the example Gfast implementation, some bit patterns in the DTU header may cause the scrambler state to reset to 0. When such a reset is followed by an all 0 DTU payload, the majority of the bits to be modulated by the iDFT will be 0. This may result in signal spikes at the output of the iDFT. Without alteration of one or more bits between retransmissions, the retransmissions may exhibit the same signal spikes. Other bit patterns in a DTU may also result in large signal spikes. However, in some models of the Gfast implementation, the frequency of empty DTUs may be enough by to warrant mitigation even in an absence of other error sources.

In some cases, to prevent excessive signal spikes from recurring for retransmissions of DTU is transmitted the system alters the DTU each time the DTU is retransmitted.

In an example scenario, the timestamp (TS) field of a DTU header may be altered between retransmissions. In the example scenario, the TS field may include a 10 bit counter that may be used to compute the age of the DTU. A retransmission state machine in the system may use the TS field to determine when a threshold or other parameter has been exceeded while waiting for a DTU. When such a parameter has been exceeded, the system time may determine that the missing DTUs may be skipped. In the example scenario, the TS field may be incremented by 1 per retransmission. In some cases, Gfast compliant systems may cease retransmissions after 21 attempts. Further, the TS field may tolerate an error of up to ±72 at the receiver. Accordingly, an increment of 1 may introduce tolerable errors into the system with regard to the value of the TS field while protecting retransmissions from repeated modulation pattern features that may cause data errors.

Figure 4:
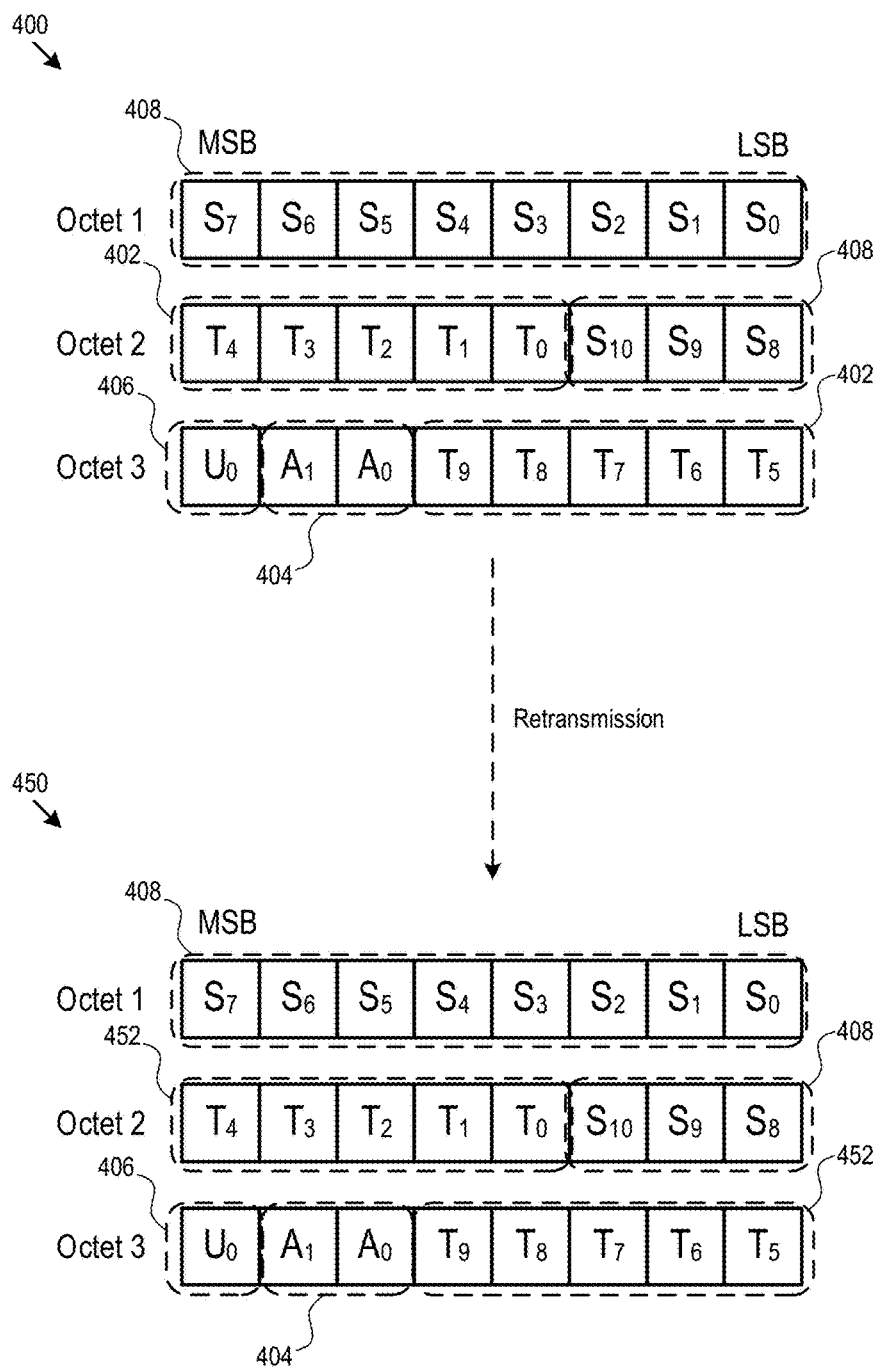
FIG. 4 shows example octet mappings of a DTU header.

The TS field 204 of a DTU may contain the value of the symbol count of the symbol at the U-interface that contains the bit S0 of the header of the DTU. Referring again to FIG. 2, the TS field 204 in the DTU header is shown. The value of TS is coded as an unsigned integer on 10 bits [T9 . . . T0]. T0 is the least significant bit (LSB) and T9 is the most significant bit (MSB). FIG. 4 shows example octet mappings 400, 450 of the DTU header. In the initial transmission DTU header octet mapping 400, the TS bits T0-T9 402, the auxiliary bits A0-A1 404, the unreserved bit U0 406, and the sequence identifier (SID) bits S0-S10 408 are mapped to the DTU header bytes. In the example retransmission octet mapping 450, one or more TS field bits 452 are altered.

The DTU header includes two reserved bits, e.g., the auxiliary bits A0, A1 404. Asserting values on these bits may not necessarily alter the behavior of a compliant receiver. As discussed above, in some implementations, the system uses a value for the reserved bits in the DTU header that changes between retransmissions to prevent signal spike problems.

In some implementations, a payload header may include a multiple-bit code (e.g., four-bit code), with multiple (e.g., seven) valid values defined. One or more of those multiple values may have defined an alternative value. The system may alternate between the alternate values.

In various implementations, multiple difference fields may be altered between retransmissions. For example, to increase the difference between a transmitted DTU and a retransmission of that DTU, the system may increment a TS field, change an auxiliary bit value, and change a code value within a payload header. The multiple points of alteration may provide a larger effective alteration than a change to single one of the fields. Further, the multiple fields may be treated as a single field to increase the available values for a predetermined sequence of alterations. For example, the two auxiliary bits may be altered in sequence along with alterations to the code value in the payload header. Accordingly, more than four values may be available to the predetermined sequence because it is operating over a field with more than two bits available.

Additionally or alternatively, the bits available to the system for alteration may be used to generate a variety of different bit permutations to allow of different retransmission values. For example, the system may use a sequence of alterations that allows for the maximum number of variations for the bits available. In some cases, the more retransmission variations that a system allows, the lower the probability that a failure mechanism will affect all of the allowed variations. However, increasing the bits dedicated to variation may increase the signaling overhead of the system. Therefore, systems may repurpose bits already in use for other tasks, such as timestamps or auxiliary bits, to increase variation without increasing signaling overhead. Nevertheless, a system may reserve virtually any portion of the DTU bits for retransmission variation.

In some implementations, particular alterations may be made for specific data patterns that may be prone to error causing modulation patterns. For example, when the DTU payload contains all or nearly all zero values. The system may fill the DTU with non-zero content that may be ignored. However, in some cases, the DTU may be intended to convey zero value content. In some systems, data pattern specific alterations may be dynamically activated or deactivated.

In some applications, a transmission system may be targeted to operate with a Mean Time Between Errors (MTBE) of at least 4 hours. However, in some cases without mitigation, modulation pattern induced errors may occur in some configurations with a MTBE of 2 minutes.

Additionally or alternatively the techniques and architectures discussed above may be generally applied in other communication systems as discussed below. The technique may be used in various systems including communication systems where a sequence of data bits is represented by an analog waveform, for example a waveform generated using a transform operation, during transmission.

In various communication systems, errors during transfer of data from a source network node to a destination may lead to corrupted or otherwise in incomprehensible data at the destination node. In some cases, particular data patterns, such as sequences or one or more data bits, may cause a system to attempt to transmit a modulation pattern that may be prone to errors. For example, some modulation pattern representations may include features, such as signal intensity spikes, that may result in errors in reception. The resulting reception errors may result from failures caused at any node. For example, reception errors may result from amplifier saturation at the source or a repeater node. Reception errors may, additionally or alternatively, result from detector saturation at the destination node.

In some cases the system may generate a modulation pattern by performing a transform, such as an inverse discrete Fourier transform (iDFT) (for example, an inverse fast Fourier Transform (iFFT)), an inverse Fourier transform, a Hartley transform, an inverse wavelet transform, or other transform on the data bits or a constellation representation of the data bits. In some systems, the modulation pattern representing a data unit, for example, a data transmission unit, packet, frame or other group of bits, may be determined by the data unit independently of other parameters. Further, transforms may be applied to groups of bits that include a portion of a data unit, a single data unit, or multiple data units. In some cases, the system may apply a transform by first applying multiple signal processing stages. For example, the system may add a CRC, apply scrambling, add Reed-Solomon redundancy, interleave signals, apply trellis coding, reorder the signal, or implement other signal processing stages.

In some cases, modulation pattern representations may be repeated during retransmission of a data pattern, such as a data transmission unit, data frame, packet or other data pattern. This may lead to multiple retransmissions of a particular modulation pattern that may include features that cause errors. In some cases, the retransmissions containing the same features as the initial transmission may result in the same errors as the original transmission. As a result, retransmission may not necessarily address the condition causing the error, and the retransmissions may fail for the same or similar reasons that the original transmission failed.

Figure 5:
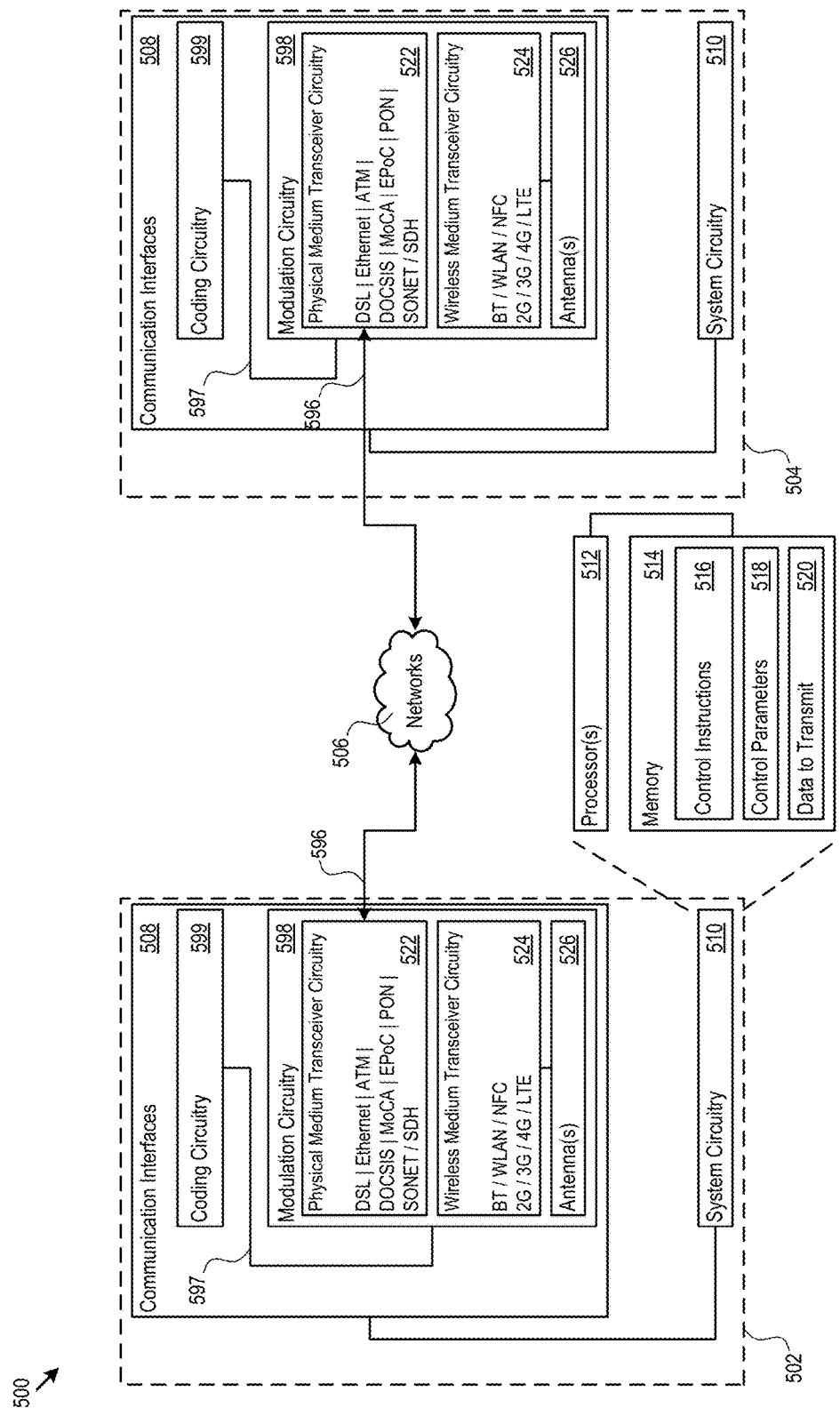
FIG. 5 shows an example of communication systems communicating across networks.

FIG. 5 shows an example 500 of communication systems 502 and 504 communicating across networks 506, e.g., using DSL techniques or other transmission schemes. In some implementations, such as various DSL-based implementations, the networks 506 may be supplanted by direct point-to-point links. The systems 502 and 504 may implement (e.g., using coding 599 and modulation 598 circuitry) DTU alteration on retransmission using any technique or combination of techniques noted above. Each system may include, e.g., communication interfaces 508 and system circuitry 510. The system may be virtually any device that transmits and receives information, including as examples, a DSL modem, gaming system, a driver assistance module in a vehicle, an emergency transponder, a pager, a satellite television receiver, a networked stereo receiver, a computer system, music player, or virtually any other device.

The system circuitry 510 may include any combination of hardware, software, firmware, or other logic. The system circuitry 510 may be implemented, for example, with one or more systems on a chip (SoC), application specific integrated circuits (ASIC), discrete analog and digital circuits, and other circuitry. The system circuitry 510 is part of the implementation of any desired functionality in the system. In that regard, the system circuitry 510 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on a user interface. The system circuitry 510 may include one or more processors 512 and memories 514. The memory 514 stores, for example, control instructions 516 that the processor 512 executes to carry out desired functionality for the system. The control parameters 518 provide and specify configuration and operating options for the control instructions 516. The memory 514 may also store data 520 for transmission over the communication interfaces 508.

In the communication interfaces 508, wireless transceiver circuitry 524 implements transmission and reception of signals through one or more antennas 526. The physical medium transceiver circuitry 522 implements transmission and reception of signals over physical media. As one example, the physical media may be a telephone line, and the transceiver circuitry 522 may include a DSL modem. The transceiver circuitry 522 may include, for instance, coding circuitry 599 and modulation circuitry 598 that implement any of the data unit alteration on retransmission techniques described herein. The modulation circuitry 598 may include an input 597 where data may be received by the modulation circuitry 598 from the coding circuitry and a modulated output 596 (e.g., to a physical transmission medium). The transceiver circuitry 522 and 524 may further include, digital to analog converters (DACs), shaping tables, analog to digital converters (ADCs), filters, waveform shapers, filters, pre-amplifiers, power amplifiers, demodulation circuitry and/or other logic for transmitting and receiving through one or more antennas, or through a physical medium.

The techniques and architectures described reduce errors in retransmission by altering the data unit between transmissions to protect against repeated retransmission of error causing modulation pattern features. In some implementations, a bit within the header or data payload near the front of the data unit. In some cases, a first data bit that is sent from coding circuitry 599 to modulation circuitry may affect the modulation pattern used for bits in the same data unit sent to the modulation circuitry after the first data bit. Accordingly, data bits near the front of the data unit may have a greater effect on the modulation pattern used to represent the data unit than data bits sent nearer to the back of the data unit. In some cases, the header for a data unit may be sent to the modulation circuitry ahead of the payload. In some cases, the system may alter bits within the header between retransmissions. For example, one or more auxiliary reserved bits within a header may be altered between retransmissions by the coding circuitry 599. Additionally or alternatively, timestamp bits within the header may be altered between transmissions by the coding circuitry 599.

In some implementations, data bits within the data payload may be altered by the coding circuitry 599 between transmissions. For example, data bits within the first half of the data unit or first half of the data payload may be altered by the coding circuitry 599. Additionally or alternatively, a pre-determined number of bits following the header within the data payload may be reserved for alterations between retransmissions.

Additionally or alternatively, the coding circuitry 599 may implement alterations between retransmissions by advancing through a predetermined sequence of bit values. For example, the predetermined sequence may include incrementing a counter or running through a repeating or non-repeating pattern. The predetermined sequence may also include advancing through a series of stored values. The predetermined sequence may use a set number of bits or may use a number of bits that changes as the predetermined sequence advances.

In an example scenario, two reserved auxiliary bits within the header of the data unit may be advanced through a predetermined four value sequence. After sets of four retransmissions the value used may be repeated by the coding circuitry 599.

In some cases, a random number generator may be used by the system to determine the value to place within bits reserved for alterations between retransmission.

Additionally or alternatively, the coding circuitry 599 may send the data payload to the modulation circuitry ahead of the header for a data unit. Thus, the coding circuitry may be free to alter one or more bits within that data payload that may effectively be at the front of the data unit. This may allow for flexibility in altering bits near the front of a data unit in cases where few (or zero) bits are available to be altered within the header.

Figure 6:
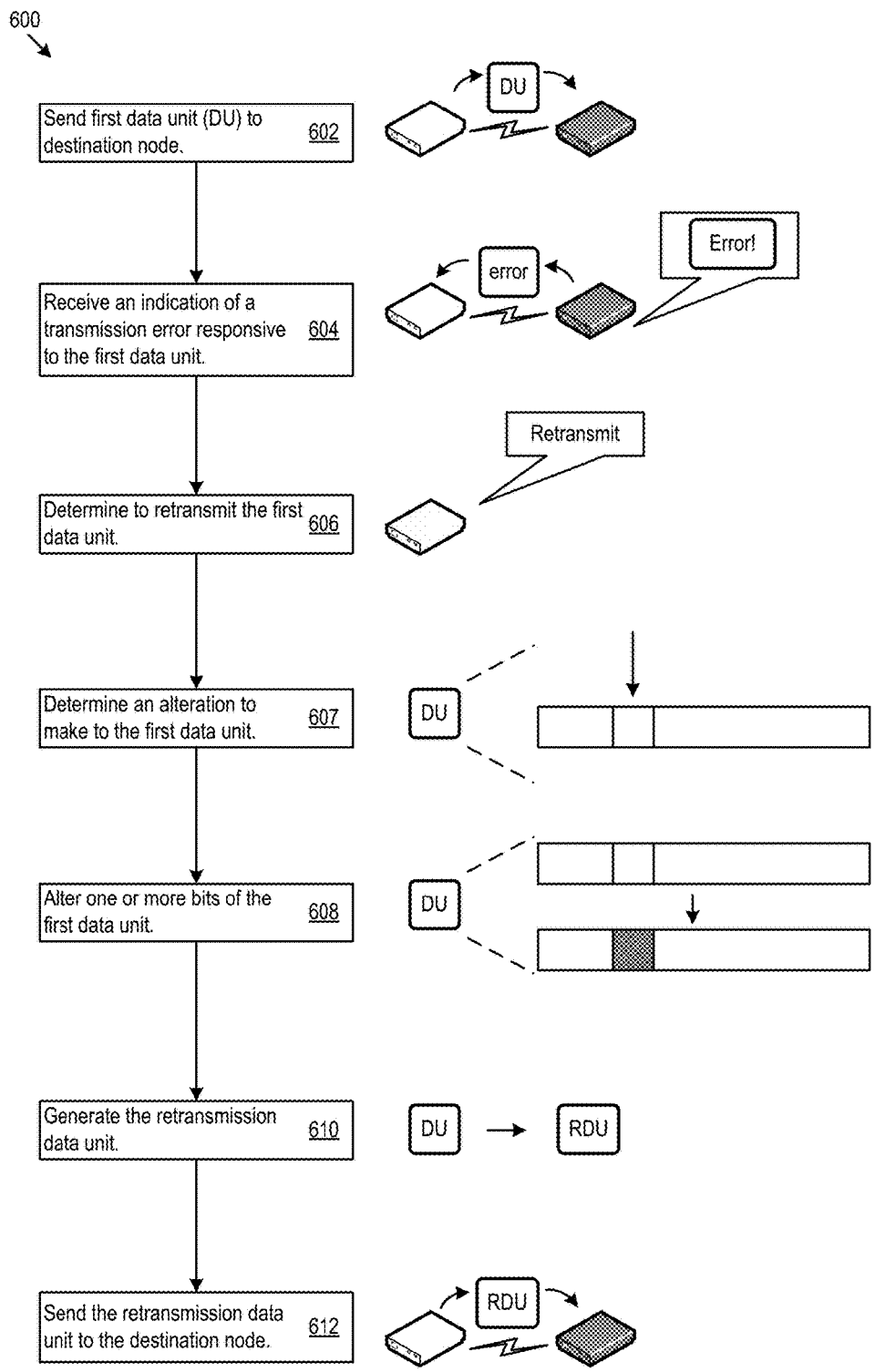
FIG. 6 shows example coding logic.

FIG. 6 shows example coding logic 600, which may be executed on circuitry. The coding logic 600 may send, e.g., via modulation circuitry 598, a first data unit to a destination node (602). The coding logic 600 may receive an indication of a transmission error for a first data unit (604). For example, the coding logic 600 may receive a retransmission request from the destination node a negative acknowledgment, an amplifier saturation indication, a non-compliant output indication from the modulation circuitry 598 or other indication of an error.

Responsive to the indication, the coding logic 600 may determine to retransmit the first data unit (606). The coding logic 600 may determine an alteration to make to the first data unit (607). For example, the coding logic 600 may determine to advance a value of a field (e.g., a reserved auxiliary bit field) in the data unit to the next value in a predetermined sequence. Additionally or alternatively, the coding logic 600 may determine increment a counter (e.g., in a numerical or chronological sequence). In some systems, the coding logic may determine to alter data within a data payload of a data unit. In other systems, the coding logic may preserve the data payload of data unit and determine to alter another portion (e.g., a header) of the data unit instead.

To generate the retransmission data unit for the first data unit, the coding logic 600 may alter one or more bits of the first data unit (608). In some cases, altering the one or more bits may also alter the modulation pattern used to represent bits sent to the modulation circuitry after the one or more bits. Accordingly, altering the one or more bits may alter the modulation patterning of one or more bits that follow the altered bits.

The coding logic 600 may then generate the retransmission data unit (610) and send the retransmission data unit to the modulation circuitry 598 (612).

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A device including:
   modulation circuitry including:
     an input; and
     modulated output; and
   coding circuitry including a data unit output coupled to the input of the modulation circuitry, the coding circuitry configured to:
     receive, from demodulation circuitry at a destination node, an indication of an error in a first data unit, the first data unit including:
       a first bit; and
       a second bit, where a modulation pattern used by the modulation circuitry to represent the second bit is determined responsive to the first bit;
     responsive to the indication, determine to retransmit the first data unit;
     alter the first data unit to generate a retransmission data unit by changing the first bit to alter the modulation pattern used by the modulation circuitry to represent the second bit; and
     send the retransmission data unit to the modulation circuitry for transmission via the modulated output, the modulated output having the altered modulation pattern that differs from the modulation pattern of the previously transmitted first data unit.

2. The device of claim 1, where the coding circuitry is configured to send the retransmission data unit to the modulation circuitry by sending the first bit ahead of the second bit.

3. The device of claim 1, where the first bit includes a bit within a header of the first data unit.

4. The device of claim 3, where the second bit includes a bit within a data payload of the first data unit.

5. The device of claim 4, where the coding circuitry is configured to generate the retransmission data unit by preserving the data payload of the first data unit.

6. The device of claim 3, where:
   the header includes a Gfast Digital Subscriber Line (DSL) compliant header; and
   the first bit includes a reserved auxiliary bit within the Gfast DSL compliant header.

7. The device of claim 3, where the first bit includes a bit within a timestamp field of the header.

8. The device of claim 1, where the coding circuitry is configured to change the first bit by advancing a value of a field of the first data unit to a next value within a predetermined sequence.

9. The device of claim 1, where the first bit includes a bit within a data payload of the first data unit.

10. The device of claim 9, where the first bit includes a bit within an initial half of the data payload sent to the modulation circuitry.

11. The device of claim 9, where the coding circuitry is configured to send the data payload to the modulation circuitry ahead of a header of the first data unit.

12. A method including:
receiving an indication of an error in a first data unit, the first data unit including:
a first bit; and
a second bit, where a modulation pattern used to represent the second bit is determined responsive to the first bit;
responsive to the indication, determining to retransmit the first data unit; and
altering the first data unit to generate a retransmission data unit by changing the first bit to alter the modulation pattern used to represent the second bit.

13. The method of claim 12, further including sending the retransmission data unit to modulation circuitry by sending the first bit ahead of the second bit.

14. The method of claim 12, where the first bit includes a bit within a header of the first data unit.

15. The method of claim 14, where the second bit includes a bit within a data payload of the first data unit.

16. The method of claim 14, where the first bit includes a bit within a timestamp field of the header.

17. The method of claim 12, where changing the first bit includes advancing a value of a field of the first data unit to a next value within a predetermined sequence.

18. A modem including:
modulation circuitry configured to:
couple to a transmission medium;
apply an inverse discrete Fourier transform (iDFT) to a portion of first data transmission unit (DTU) including a first header and a data payload portion to generate a first modulation pattern representing the data payload portion during transmission over the transmission medium;
apply the iDFT to a portion of a retransmission DTU including a second header and the data payload portion to generate a second modulation pattern representing the data payload portion during transmission over the transmission medium, the second modulation pattern different from the first;
coding circuitry coupled to the modulation circuitry, the coding circuitry configured to:
send the portion of the first DTU to the modulation circuitry for transmission over the transmission medium;
receive, in response to the portion of the first DTU, a retransmission request;
responsive to the retransmission request determining to retransmit the portion of the first DTU;
advance a field of the first header to a next value in a pre-determined sequence to generate the second header;
generate the portion of the retransmission DTU with the second header such that the modulation circuitry represents the data payload portion using the second modulation pattern instead of the first modulation pattern when the iDFT is applied to the portion of the retransmission DTU; and
send the portion of the retransmission DTU to the modulation circuitry for transmission over the transmission medium.

19. The modem of claim 18, where:
The first header includes a Gfast Digital Subscriber Line (DSL) compliant header;
the field includes two reserved auxiliary bits within the Gfast DSL compliant header; and
the pre-determined sequence includes a sequence of four bitwise values of the two reserved auxiliary bits.

20. The modem of claim 18, where the modulation circuitry is configured to:
apply the iDFT to the portion of the first DTU by first adding a cyclic redundancy check, applying scrambling, adding Reed-Solomon redundancy, interleaving, applying trellis coding, or any combination thereof; and
apply the iDFT to the portion of the retransmission DTU by first adding a cyclic redundancy check, applying scrambling, adding Reed-Solomon redundancy, interleaving, applying trellis coding, or any combination thereof.

* * * * *